July 21, 1964
E. HAAS
3,141,195
MOLD ASSEMBLY FOR MOLDED SHOE BOTTOM
Filed Jan. 18, 1963
3 Sheets-Sheet 1
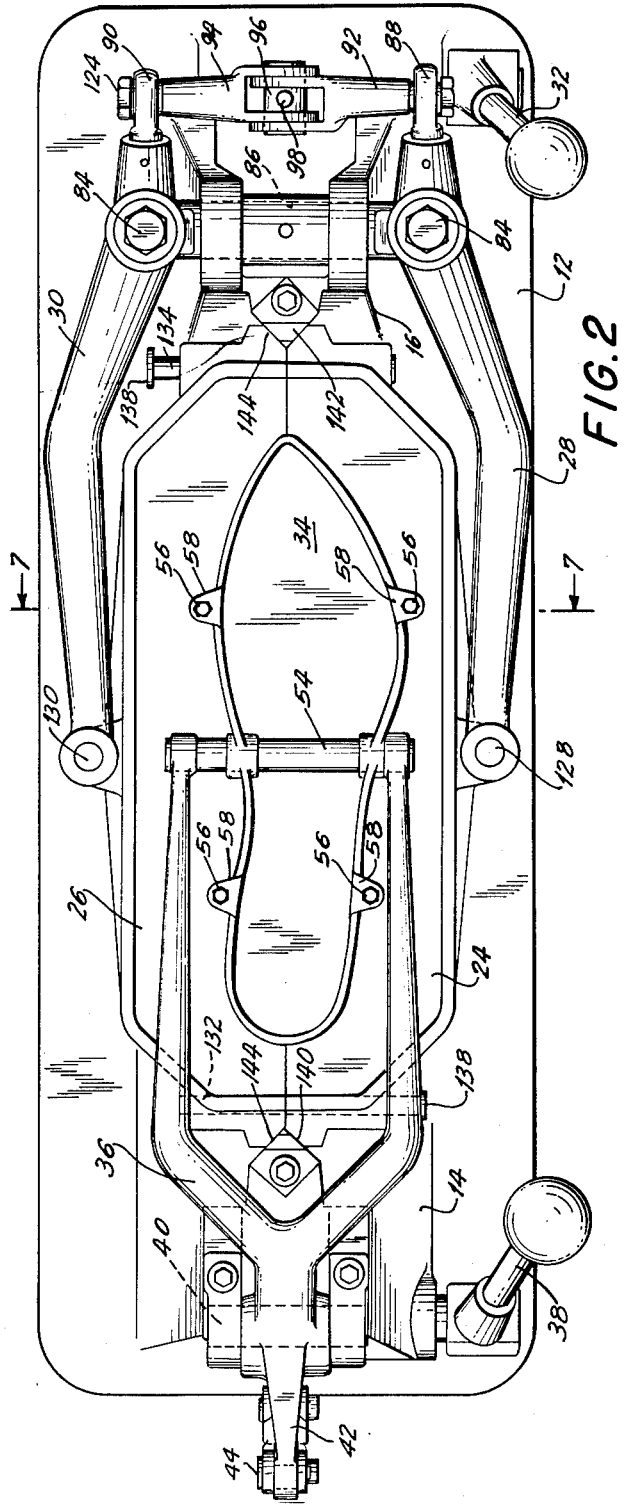
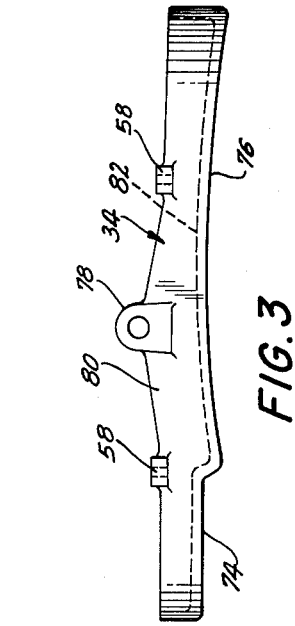
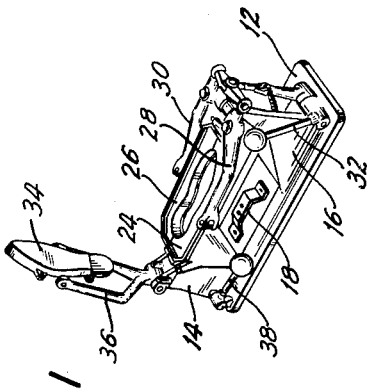
INVENTOR.
EDGAR HAAS
BY James and Franklin
ATTORNEYS July 21, 1964   E. HAAS   3,141,195
MOLD ASSEMBLY FOR MOLDED SHOE BOTTOM
Filed Jan. 18, 1963   3 Sheets-Sheet 2

INVENTOR.
EDGAR HAAS
BY James and Franklin
ATTORNEYS

July 21, 1964    E. HAAS    3,141,195
MOLD ASSEMBLY FOR MOLDED SHOE BOTTOM
Filed Jan. 18, 1963    3 Sheets-Sheet 3

INVENTOR.
EDGAR HAAS
BY James and Franklin
ATTORNEYS

United States Patent Office 3,141,195
Patented July 21, 1964

3,141,195
MOLD ASSEMBLY FOR MOLDED SHOE BOTTOM
Edgar Haas, New York, N.Y., assignor to Herman Schwabe, Inc., Brooklyn, N.Y., a corporation of New York
Filed Jan. 18, 1963, Ser. No. 252,353
18 Claims. (Cl. 18—17)

This invention relates to the manufacture of shoes, and more particularly to molds for making shoes with molded shoe bottoms.

Leather soles have been attached by nails, by sewing, and by cement, and rubber soles have been attached by vulcanizing. More recently a shoe bottom consisting of a sole and heel formed integrally out of a suitable synthetic plastics material has been developed, this being attached to an upper, as by cement. Still more recently a very desirable plastics material, polyvinyl chloride, has been applied directly to a shoe bottom by injection molding under high pressure. This requires heavy expensive molds, and is troublesome because changes in style require new molds, apart from the many molds needed for the different combinations of length and width of shoe.

It has accordingly now been proposed to use a special polyvinyl chloride formulation which reacts and sets under heat without requiring pressure.

The primary object of the present invention is to provide an improved mold assembly for this latter process. A more specific object is to provide a mold assembly which is light and inexpensive so that many molds may be provided, which if desired may be fed in succession on a conveyor through an oven for heating the plastics material in order to react and set the same. Still another object is to provide a mold assembly which is readily manually operable by means of two spaced levers which may be operated with minimum skill and effort, and yet which effectively control the movements of the parts of the mold. A still further object is to so devise the mold mechanism and linkage that the mold cavity parts which change with style, shape or size of shoe, may be readily replaced.

To accomplish the foregoing general objects, and other more specific objects which will hereinafter appear, my invention resides in the mold assembly elements and their relation one to another, as are hereinafter more particularly described in the following specification. The specification is accompanied by drawings in which:

FIG. 1 is a perspective view, drawn to very small scale, showing a mold assembly embodying features of my invention;

FIG. 2 is a plan view of the same;

FIG. 3 is a side elevation of the cover plate (sole and heel plate) of the mold;

Figure 4:
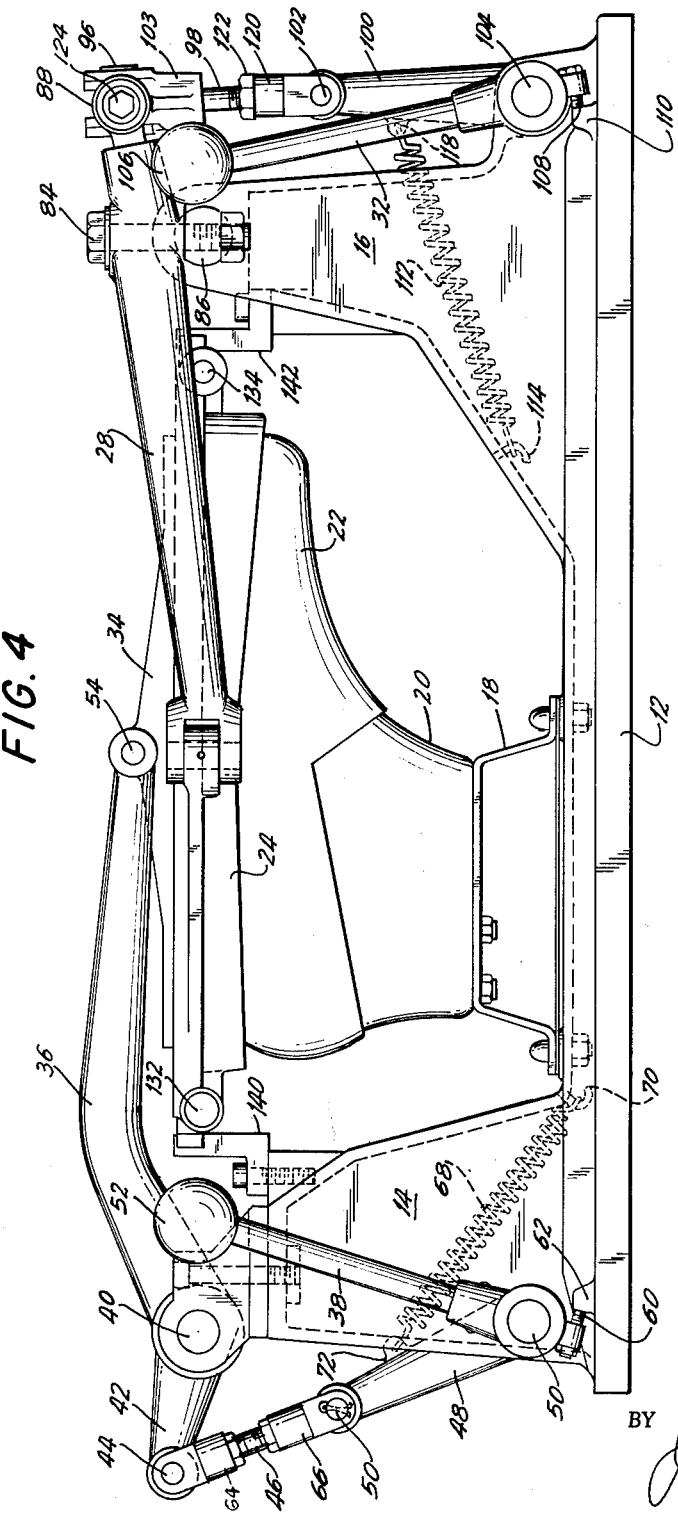
FIG. 4 is a side elevation of the mold assembly.

Referring to the drawing, and more particularly to FIG. 1, the mold assembly comprises a base 12 having pedestals 14 and 16. An inverted shoe last, not shown in FIG. 1, is mounted between the pedestals, and referring to FIG. 4, there is a support 18 secured to the base 12, and carrying an inverted last 20 on which a shoe upper 22 is supported.

Reverting to FIG. 1, the perimeter of the desired mold cavity is defined by a longitudinally split ring mold made up of separable halves 24 and 26. These are carried by ring support levers 28 and 30 which are fulcrumed on pedestal 16 for universal movement, that is, they may move outward and also upward. This is done under control of a manually operable lever 32. The mold cavity is completed by a cover plate (sole and heel plate) 34 carried on an arm 36 which may be moved upward to the open position shown in FIG. 1 by means of a manually operable control lever 38. The linkage between each control lever and the arms operated thereby preferably exerts considerable pressure and is self-locking.

Figure 6:
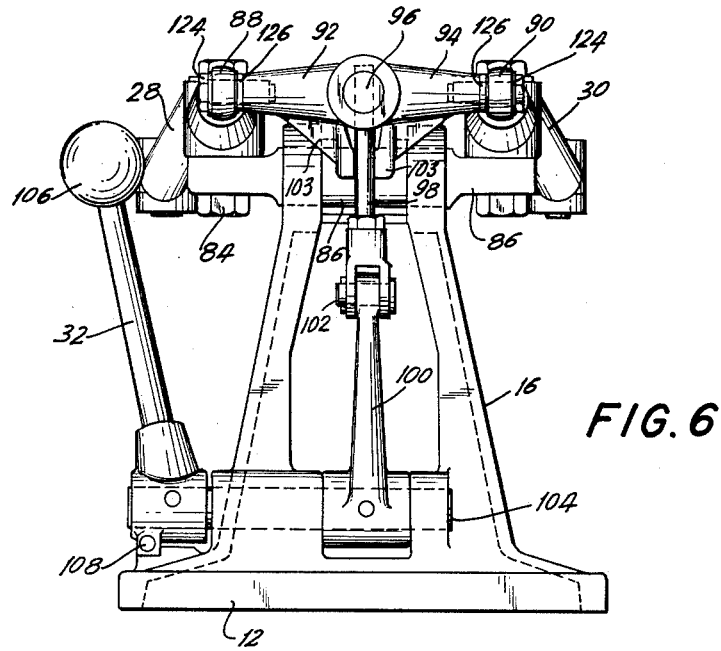
FIG. 6 is an end view of the mold assembly, looking toward the right end of FIG. 4.

Referring now to FIGS. 2, 4 and 6 of the drawing, the cover plate 34 which closes the top of the mold cavity is carried by a lever 36 which is pivoted on a bearing pin 40 at the top of pedestal 14. Its outward extension 42 is connected at 44 to the upper end of an upright toggle linkage consisting of an upper link 46 and a lower link 48 joined at 50. The lower end of link 48 is secured to a shaft 50 passing through the lower end of pedestal 14, and the forward end of this shaft carries the manually operable lever 38 with its ball or handle 52. It will be evident that raising lever 38 straightens the toggle 46, 48 and lowers the cover plate 34, and that downward movement of lever 38 releases the toggle and raises the arm 36 and cover plate 34 from the closed position shown in FIGS. 2 and 4, to the open position shown in FIG. 1.

The connection between arm 36 and plate 34 is preferably a pivotal one, as shown by shaft 54. The shaft is at the middle of the cover. The exact position of the cover when closed may be adjusted by means of four stop screws 56 (FIG. 2), these being threadedly adjustable in stop ears 58 which project outwardly from plate 34 above the halves 24 and 26 of the ring mold. This adjustment determines the angle of the cover as well as its height, and helps determine the thickness of the molded shoe bottom.

Reverting to FIG. 4, the motion of control lever 38 is limited by a suitable stop screw 60 bearing against a fixed abutment 62. Screw 60 is so adjusted as to bring the toggle 46, 48 into or slightly beyond dead center position, so that the linkage is self-locking. The linkage is itself adjustable because link 46 is threaded and is adjustably received in the ends 64 and 66. For this purpose left hand and right hand threads may be used, but in the present case I provide right hand threads, one of which has a coarser pitch than the other, so that rotation of part 46 produces a change in length. This adjustment, and other thread adjustments illustrated, are fixed by suitable lock nuts.

To reduce the effort required in opening the mold, a counterbalance spring 68 may be provided, this being connected to the base at 70 and to the link 48 at 72.

The support arm 36 which carries the plate 34 is preferably widely bifurcated, as clearly shown in FIG. 2. This is done because the molded material is preferably reacted by radiant heat lamps shining downward from above the mold. A single support arm above cover 34 would interfere with the desired rapid heating, whereas with widely spaced arms as here shown, there is no interference. This is particularly desirable when, as here, the single arm would pass over the heel portion, where the molded material is thickest and requires maximum heat.

FIG. 3 shows the cover 34 alone, and it will be seen that the heel surface 74 is raised relative to the sole surface 76. This drawing also shows the stop ears 58 which receive the adjustable stop screws (not shown), and the bearings 78 which receive the pivot pin. The cover 34 has a wide peripheral wall 80 (see also FIG. 7) which fits within the ring mold, but the bottom surface of cover 34 is substantially reduced in thickness, as shown at 82 (FIG. 3). This improves heat transfer.

The mechanism for operating the ring mold is somewhat more complex because the halves of the ring mold must be spread laterally as well as raised. Again referring to FIGS. 2, 4 and 6, the arms 28 and 30 are pivoted on vertical pivots 84, carried at the ends of a horizontal shaft 86, which is carried in the upper end of pedestal 16. The combination of vertical and horizontal pivots affords universal movement of the arms. The outer ends 88 and 90 of arms 28 and 30 are connected by a horizontal toggle linkage comprising links 92 (FIG. 2) and 94, joined by a horizontal barrel nut at 96. An upright toggle linkage comprises links 98 (FIG. 4) and 100 joined by a pin at 102. The upper end of rod 98 of this linkage is screwed into the barrel nut 96, thus connecting the upright linkage 98, 100 to the middle of the horizontal linkage 92, 94.

The lower end of link 100 is fixed on a horizontal shaft 104 passing through the lower end of pedestal 16. At its forward end this shaft carries the manually operable lever 32 previously referred to, and the upper end of which has a handle or ball 106. It will be seen that lever 32 serves to release or to straighten the upright toggle linkage, and when it is moved downward to release the linkage it first releases the horizontal linkage, thereby separating the halves 24 and 26 of the split ring, and it then raises the split ring upward out of the way to an upright position like that shown for the cover 34 in FIG. 1.

The straight or locked position of the upright linkage may be controlled by a stop screw 108 (FIG. 4) bearing against a fixed abutment 110. Depending stop members 103 (FIG. 6) on the links 92 and 94 limit the locked position or straightened position of the horizontal toggle. They bear against the sides of the link or rod 98.

The mass of the split ring which must be raised may be counterbalanced by means of a pull spring 112 having one end connected to the pedestal at 114, and having its other end connected at 118 to the toggle link 100. The length of the upright linkage is adjustable because the portion 98 is threadedly received in end 120, the adjustment being locked by a nut 122.

The complex pivotal movement required at the outer ends of the arms 28 and 30 is obtained by making the end bearings 88 and 90 spherical rod ends which are separate from the main cast arms. They comprise a spherical seat containing a ball with a hole which receives a screw 124 which is tightened in link 92 or 94. This accommodates the release motion of the horizontal toggle 92, 94. The bearings 88 and 90 are fixed in arms 28 and 30, as by means of cross pins.

As best shown in FIGS. 4 and 6, the ends of the horizontal shaft 86 are flattened to receive the vertical pins 84 which act as the vertical pivots for the arms 28 and 30. The pins 84 may be stepped in diameter to maintain bearing freedom when the nuts are tightened. The length of horizontal toggle links 92, 94 is adjustable by the insertion or removal of washers, indicated at 126 in FIG. 6.

Referring to FIG. 2, the half ring 24 is pivotally connected to arm 28 by an upright pivot 128 located midway between the ends of the ring, and similarly the other half 26 of the ring mold is pivotally connected to arm 30 by means of a pivot 130. The halves 24 and 26 are preferably maintained in alignment by means of horizontal slidable pins 132 and 134. The inner end of a pin is threadedly received or pinned in one ring, and the outer end of the pin has a motion limiting head 138. The pins may be oppositely directed as here shown. They limit the separation of the mold halves, and thus insure prompt raising of the ring mold after it has opened somewhat. The pins here serve a dual purpose, for both alignment and motion limiting.

The mold assembly preferably includes additional means to insure centering of the ring mold 24, 26 relative to the last. For this purpose the pedestal 14 carries an upright centering wedge 140 (FIG. 2), and the pedestal 16 carries a similar upright centering wedge 142. The halves of the ring mold have mating surfaces 144. It will be understood that with this arrangement the ring mold is automatically located in a fixed desired position when its halves come together.

Figure 7:
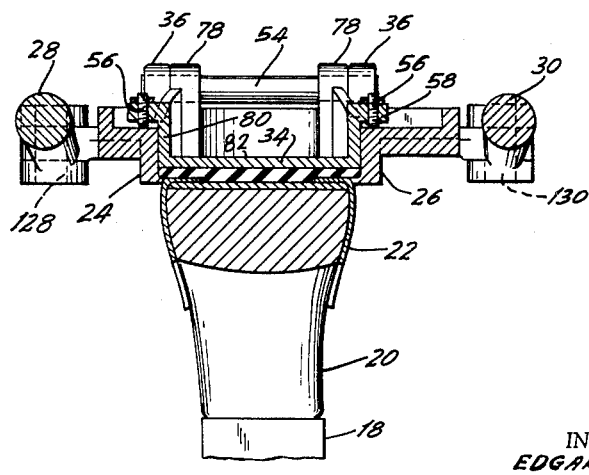
FIG. 7 is a fragmentary transverse section taken approximately in the plane of the line 7—7 of FIG. 2.

Referring now to FIG. 7, the lower inner edge of the ring mold 24, 26 is suitably shaped to engage the shoe upper 22, and to provide the style and amount of peripheral sole projection desired. The adjustment of the height of the cover mold or plate 34 determines the thickness of the sole. The plastics material, preferably polyvinyl chloride, may be poured in measured quantity over the bottom of the shoe after the ring mold has been closed and while the cover is still open, as shown in FIG. 1. The cover then may be closed. It is also possible to provide the cover with a fill opening, and to then first close the cover and afterward inject the plastics material through the opening, using the nozzle of a hand-held supply unit or hose.

In accordance with one prior suggestion, a narrow ring of the plastics material may be preliminarily applied around the periphery of the upper, that is, just inside the ring mold while the cover mold is still open. This material then may be heated to set the same before the main body of plastics material is applied to the shoe. A suitable gun or extruding device is used for this purpose, and it has the advantage of preventing escape of material around the upper, called spew or flash. Such spew, if not prevented, must be cut away later, requiring an extra operation which is costly and undesirable. By preliminarily extruding a ring of material and permitting the same to gel, the spew or flash is prevented.

Figure 5:
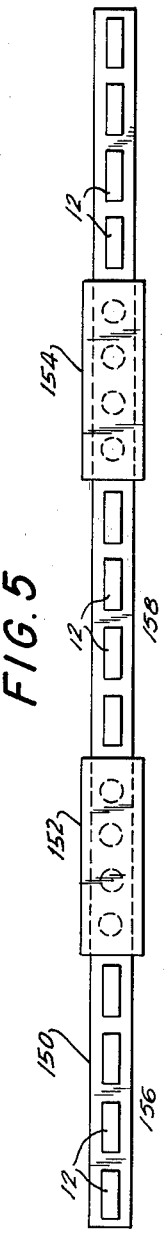
FIG. 5 is a schematic plan view showing how a quantity of molds may be used on a conveyor passing through heating ovens.

A manufacturing procedure utilizing the present molds is schematically illustrated in FIG. 5, there being a slowly moving conveyor 150 which passes through a first oven 152 and a second oven 154. These may employ banks of radiant heat lamps shining downward, thus applying heat to the inverted shoe bottoms. The molds are indicated at 12. An operator located at 156, ahead of oven 152, employs a gun or extruding device to apply the preliminary sealing ring of polyvinyl chloride. This said peripheral ring is reacted or set in oven 152, whereupon another operator stationed at 158 between the ovens, fills the mold with a measured charge of the polyvinyl chloride. This is reacted or set in the oven 154.

It will be understood that the conveyor arrangement may be elaborated to provide for return of the molds to the starting end. It will also be seen that the simplicity and comparative lightness of the present manually operable mold assembly is desirable for the handling of a series of such molds, apart from reduction in cost when a large number of molds are used. Most of the cast parts of the mold assembly are preferably made of a light weight metal, such as aluminum. The molds may be disposed transversely of the conveyor, in which case the heat lamps may be so arranged as to apply greater heat at the heel end than at the sole end.

It is believed that the construction and operation of my improved mold assembly, as well as the advantages thereof, will be apparent from the foregoing detailed description. A steel mold such as is required for vulcanizing, or for injection molding under high pressure, costs about ten times as much as the present mold. In the event of change in style or size, it is only the ring mold 24, 26 and the cover mold 34 which need be changed. The change is readily made, and the other parts may remain as shown. The mold assembly is manually operable with minimum effort, and by simple direct movement of two spaced levers.

It will be apparent that, while I have shown and described the invention in a preferred form, changes may be made without departing from the scope of the invention, as sought to be defined in the following claims.

I claim:

1. A mold assembly for molding a shoe bottom, said assembly comprising a base having a pedestal at one end, means to mount an inverted shoe last for supporting an upper, a longitudinally split ring mold to enclose the upper near the sole, ring support levers carrying the halves of the ring mold, means to fulcrum said levers on said pedestal for universal pivotal movement, a horizontal toggle linkage connected between the outer ends of the ring support levers, an upright toggle linkage connected at its upper end to the middle of the horizontal toggle linkage, and a manually operable control lever to either release or to straighten the upright toggle linkage, the arrangement being such that the halves of the ring are separated and raised out of the way when the upright toggle linkage is released by the control lever.

2. A mold assembly for molding a shoe bottom, said assembly comprising a base having a pedestal at one end, means to mount an inverted shoe last for supporting an upper, a ring mold to enclose the upper near the sole, a sole and heel mold plate for closing the top of the ring mold, a support lever pivotally carrying said plate, said plate support lever being pivoted on said pedestal, an upright toggle linkage connected to the outer end of the plate support lever, and a manually operable control lever to either release or to straighten the upright toggle linkage, the plate being raised out of the way when the toggle linkage is released.

3. A mold assembly for molding a shoe bottom, said assembly comprising a base having a pedestal at each end, means to mount an inverted shoe last for supporting an upper between the pedestals, a longitudinally split ring mold to enclose the upper near the sole, ring support levers carrying the halves of the ring mold, means to fulcrum said levers on one of said pedestals for universal pivotal movement, a horizontal toggle linkage connected between the outer ends of the ring support levers, an upright toggle linkage connected at its upper end to the middle of the horizontal toggle linkage, a normally operable ring control lever to either release or to straighten the upright toggle linkage, the arrangement being such that the halves of the ring are separated and raised out of the way when the upright toggle linkage is released by the ring control lever, a sole and heel mold plate for closing the top of the ring mold, a support lever pivotally carrying said plate, said plate support lever being pivoted on the other pedestal, an upright toggle linkage connected to the outer end of the plate support lever, and a manually operable plate control lever connected to either release or to straighten the latter upright toggle linkage, the plate being raised out of the way when the toggle linkage is released.

4. A mold assembly for molding a shoe bottom, said assembly comprising a base having a pedestal at each end, means to mount an inverted shoe last for supporting an upper between the pedestals, a longitudinally split ring mold to enclose the upper near the sole, ring support levers carrying the halves of the ring mold, means to fulcrum said levers on one of said pedestals for movement about vertical and horizontal axes, a horizontal toggle linkage connected between the outer ends of the ring support levers, an upright toggle linkage connected at its upper end to the middle of the horizontal toggle linkage, a manually operable ring control lever arranged to either release or to straighten the upright toggle linkage, the arrangement being such that the halves of the ring are separated and raised out of the way when the upright toggle linkage is released by the ring control lever, a sole and heel mold plate for closing the top of the ring mold, a widely bifurcated support lever pivotally carrying said plate, said plate support lever being pivoted on the other pedestal, an upright toggle linkage connected to the outer end of the plate support lever, and a manually operable plate control lever connected to either reelase or to straighten the latter upright toggle linkage, the plate being raised out of the way when the toggle linkage is released, the major parts of said mold being made of a light weight metal such as aluminum.

5. A mold assembly as defined in claim 1 in which there are means to limit the separation of the halves of the ring to a desired small amount, whereby the remainder of the available toggle motion causes raising of the ring.

6. A mold assembly as defined in claim 3 in which there are means to limit the separation of the halves of the ring to a desired small amount, whereby the remainder of the available toggle motion causes raising of the ring.

7. A mold assembly as defined in claim 1 in which there are horizontal dowel pins acting as pilots across the ends of the split ring mold to keep the halves of the ring mold in registration when they are moved toward one another around a shoe upper on the last.

8. A mold assembly as defined in claim 3 in which there are horizontal dowel pins acting as pilots across the ends of the split ring mold to keep the halves of the ring mold in registration when they are moved toward one another around a shoe upper on the last, said pins having heads which limit the separation of the halves.

9. A mold assembly as defined in claim 1 in which there are additional fixed means engaging the halves of the ring as they come together to fix the location of the ring mold relative to the last.

10. A mold assembly as defined in claim 3 in which the pedestals carry upright centering wedges cooperating with mating angular surfaces at the ends of the halves of the ring mold for centering the ring mold relative to the last.

11. A mold assembly as defined in claim 3 in which the pedestals carry upright centering wedges cooperating with mating angular surfaces at the ends of the ring mold for centering the ring mold relative to the last, and in which there are horizontal dowel pins acting as pilots across the ends of the split ring mold to keep the halves of the ring mold in registration when they are moved toward one another around a shoe upper on the last.

12. A mold assembly as defined in claim 1 in which the ring control lever is mounted on one end of a horizontal shaft which fixedly carries the lower end of the lower link of its upright toggle linkage.

13. A mold assembly as defined in claim 2 in which the plate control lever is mounted on one end of a horizontal shaft which fixedly carries the lower end of the lower link of its upright toggle linkage.

14. A mold assembly as defined in claim 3 in which the ring control lever is mounted on one end of a horizontal shaft which also carries the lower end of the lower link of its upright toggle linkage, and in which the plate control lever is mounted on one end of a horizontal shaft which also carries the lower end of the lower link of its upright toggle linkage.

15. A mold assembly as defined in claim 3 in which there are pull springs urging the toggle linkages to released position in order to assist the raising of the ring and the plate.

16. A mold assembly as defined in claim 2 in which the plate support lever is widely bifurcated in order to expose the top of the plate for radiant heating.

17. A mold assembly as defined in claim 1 in which there is means to prevent the horizontal toggle linkage from moving upward beyond locking position.

18. A mold assembly for molding a shoe bottom, said assembly comprising a base having a pedestal at each end, means to mount an inverted shoe last for supporting an upper between the pedestals, a longitudinally split ring mold to enclose the upper near the sole, ring support levers carrying the halves of the ring mold, means to fulcrum said levers on one of said pedestals, a manually operable ring control lever arranged to separate the halves of the ring and to raise them out of the way, a sole and heel mold plate for closing the top of the ring mold, a support lever pivotally carrying said plate, said plate support lever being pivoted on the other pedestal, and a manually operable plate control lever connected to raise the plate out of the way.

References Cited in the file of this patent

UNITED STATES PATENTS

| | | |
|---|---|---|
| 1,642,013 | Collins | Sept. 13, 1927 |
| 2,525,609 | Lewis | Oct. 10, 1950 |

FOREIGN PATENTS

| | | |
|---|---|---|
| 91,796 | Sweden | Mar. 18, 1938 |